United States Patent
Quitmeyer et al.

(10) Patent No.: US 7,560,888 B2
(45) Date of Patent: Jul. 14, 2009

(54) ELECTROMECHANICAL ACTUATOR INCLUDING REDUNDANT, DISSIMILAR POSITION FEEDBACK

(75) Inventors: James N. Quitmeyer, Chandler, AZ (US); Kellan P. Geck, Chandler, AZ (US); Paul S. Evans, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 538 days.

(21) Appl. No.: 11/223,325

(22) Filed: Sep. 8, 2005

(65) Prior Publication Data
US 2007/0051847 A1    Mar. 8, 2007

(51) Int. Cl.
*G05B 11/18* (2006.01)

(52) U.S. Cl. .................. 318/590; 318/594; 318/616

(58) Field of Classification Search ............ 318/34, 318/113, 616, 617, 618, 640, 700, 590, 594
See application file for complete search history.

(56) References Cited

U.S. PATENT DOCUMENTS

| | | | |
|---|---|---|---|
| 2,630,022 A | 3/1953 | Terdina | |
| 2,860,266 A | 11/1958 | Schrader | |
| 4,289,996 A | 9/1981 | Barnes et al. | |
| 4,549,695 A | 10/1985 | Sears | |
| 4,614,128 A | 9/1986 | Fickler | |
| 4,637,272 A | 1/1987 | Teske et al. | |
| 4,661,756 A * | 4/1987 | Murphy et al. | 318/701 |
| 4,710,865 A * | 12/1987 | Higomura | 700/63 |
| 4,715,262 A * | 12/1987 | Nelson et al. | 89/36.02 |
| 4,810,941 A * | 3/1989 | Ohishi et al. | 388/815 |
| 4,834,319 A * | 5/1989 | Ewy et al. | 244/99.9 |
| 4,858,491 A | 8/1989 | Shube | |
| 4,928,050 A * | 5/1990 | Torisawa et al. | 318/696 |
| 5,030,900 A * | 7/1991 | Kono et al. | 318/592 |
| 5,214,972 A | 6/1993 | Larson et al. | |
| 5,543,696 A * | 8/1996 | Huggett et al. | 318/590 |
| 5,628,234 A | 5/1997 | Crook et al. | |
| 5,769,748 A | 6/1998 | Eyerly et al. | |
| 6,382,559 B1 | 5/2002 | Sutterfield et al. | |
| 6,546,716 B2 | 4/2003 | Lair | |
| 6,651,438 B2 | 11/2003 | McGrath et al. | |
| 2002/0171383 A1* | 11/2002 | Hisada et al. | 318/432 |

\* cited by examiner

*Primary Examiner*—Bentsu Ro
*Assistant Examiner*—David S Luo
(74) *Attorney, Agent, or Firm*—Ingrassia Fisher & Lorenz, P.C.

(57) ABSTRACT

A relatively small, lightweight actuator includes a plurality of motors, an actuation element, a translation member, and a plurality of position sensors. The motors each supply a drive force to the actuation member, causing it to rotate. The translation member is configured, upon rotation of the actuator, to translate to a position. The position sensors sense the translational position of the translation member and the rotational position of each motor. The actuator is relatively small, lightweight, and can withstand the relatively severe environmental conditions and relatively significant levels of vibration and shock associated with many aerospace applications.

16 Claims, 4 Drawing Sheets

ELECTROMECHANICAL ACTUATOR INCLUDING REDUNDANT, DISSIMILAR POSITION FEEDBACK

TECHNICAL FIELD

The present invention relates to actuators and, more particularly, to an actuator that is compact, lightweight, resistant to vibration and shock, and includes redundant, dissimilar position feedback sensors.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and missile thrust vector control systems, the actuators that are used may be subject to relatively severe environmental conditions, as well as relatively high magnitude shock and vibration.

In addition to the above factors, many vehicle systems that include actuators are being designed to include relatively compact, lightweight actuators and, in some instances, actuators that have relatively high frequency responses. Although various relatively compact and lightweight actuators are presently available, many of these available actuators may not be able to sufficiently withstand the relatively severe environmental conditions, and/or the relatively high shock and vibration demands. Similarly, while robust actuators are presently available that can withstand the relatively severe environmental conditions and/or the relatively high shock and vibration demands, these actuators may not be sufficiently compact and/or lightweight. Moreover, the actuators may need to include relatively high power drive motors to meet the desired frequency response.

Hence, there is a need for an actuator that is compact and lightweight, that can withstand the relatively severe environmental conditions and/or relatively high shock and vibration demands associated with various aerospace applications, and that exhibits a relatively high frequency response without the use of a relatively high power motor. The present invention addresses at least this need.

BRIEF SUMMARY

The present invention provides a relatively small, lightweight actuator that can withstand relatively severe environmental conditions and relatively significant levels of vibration and shock. In one embodiment, and by way of example only, an actuator assembly includes a motor, an actuation element, a translation member, a first position sensor, and a second position sensor. The motor is adapted to receive electrical drive power and is configured, upon receipt thereof, to supply a drive force. The actuation member is coupled to receive the drive force from the motor and is configured, upon receipt thereof, to rotate. The translation member is disposed adjacent the actuator and is configured, upon rotation of the actuator, to translate to a position. The first position sensor is mounted within the actuation member and is configured to sense the position of the translation member and supply a first position signal representative thereof. The second position sensor is coupled to receive the drive force from at least one of the plurality of motors and is operable, upon receipt thereof, to supply a second position signal representative of the position of the translation member.

In another exemplary embodiment, an actuator assembly includes a housing, a motor, a ballscrew, a ballnut, a plurality of balls, a first position sensor, and a second position sensor. The plurality of motors are each mounted on the housing, and each is configured to supply a rotational drive force. The ballscrew is rotationally mounted within the housing and includes at least an inner surface and an outer surface. The ballscrew inner surface defines a sensor cavity, and the ballscrew outer surface has a plurality of ball grooves formed thereon. The ballscrew is adapted to receive the rotational drive force from each of the motors and is configured, in response thereto, to rotate. The ballnut is disposed at least partially within the housing and is mounted against rotation, is disposed at least partially around the ballscrew, and includes at least an inner surface and an outer surface. The ballnut inner surface has a plurality of ball grooves formed thereon. The plurality of balls is disposed within the ballnut ball grooves and at least selected ones of the ballscrew ball grooves, whereby rotation of the ballscrew causes translation of the ballnut to a position. The first position sensor is disposed at least partially within the ballscrew cavity, and is configured to sense the position of the ballnut and supply a position signal representative thereof. The second position sensor is coupled to receive the drive force from at least one of the plurality of motors and is operable, upon receipt thereof, to supply a second position signal representative of the position of the ballnut.

In yet another exemplary embodiment, an actuation control system includes a motor, an actuation member, a translation member, a first position sensor, a second position sensor, and a controller. The motor is coupled to receive actuator position control signals and is operable, in response thereto, to supply a drive force. The actuation member is coupled to receive the drive force from the motor and is configured, upon receipt thereof, to rotate. The translation member is disposed adjacent the actuation member and is adapted to couple to an aerospace flight control component. The translation member is configured, upon rotation of the actuation member, to translate to a position. The first position sensor is mounted within the actuation member and is configured to sense the position of the translation member and supply a position feedback signal representative thereof. The second position sensor is coupled to receive the drive force from at least one of the plurality of motors and is operable, upon receipt thereof, to supply a second position feedback signal representative of the position of the translation member. The controller is adapted to receive control signals, and is coupled to receive the first and second position feedback signals. The controller is configured, in response to the received signals, to supply the actuator position control signals to the plurality of motors.

Other independent features and advantages of the preferred actuator assembly will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific vehicle or system. Thus, although the description is explicitly directed toward an embodiment that is implemented in an aircraft flight surface control system or a missile thrust vector control system, it should be appreciated that it can be implemented in other vehicles and other actuation system designs, including those known now or hereafter in the art.

Figure 1:
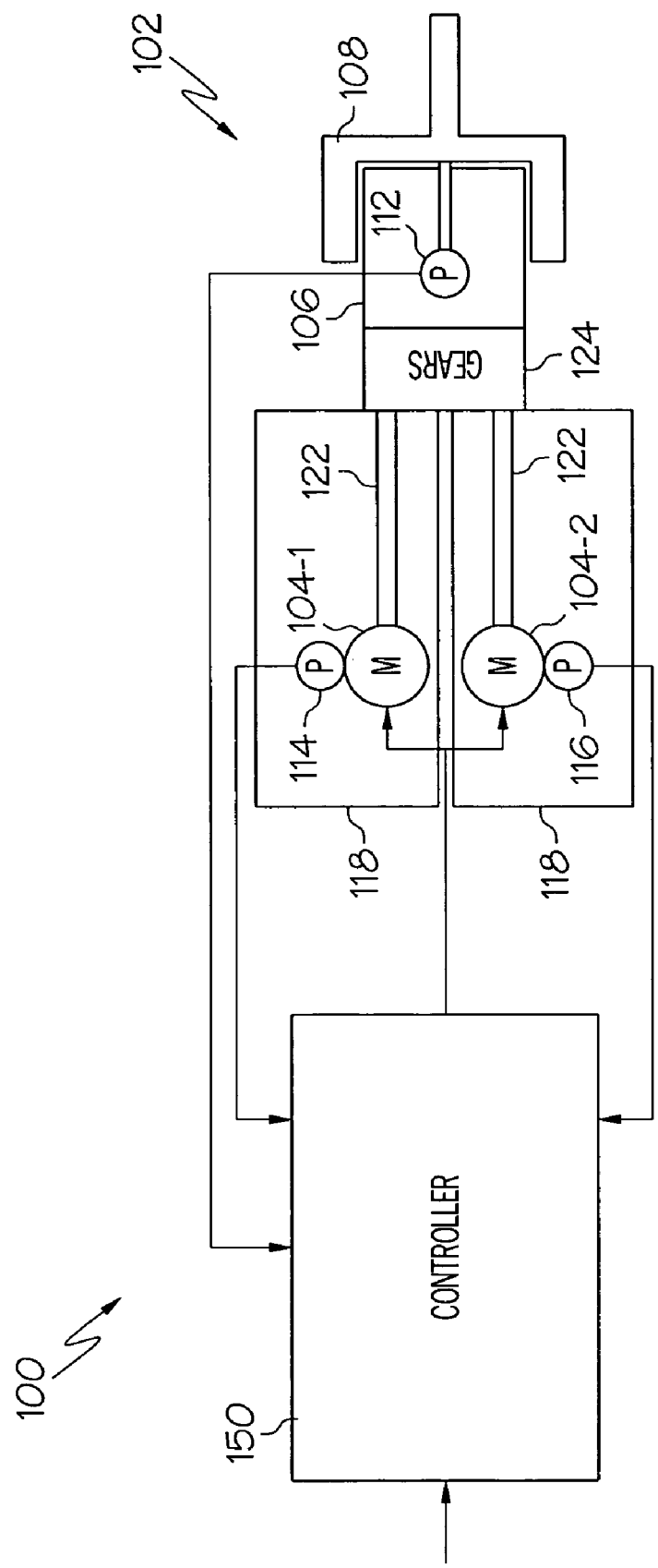
FIG. 1 is a functional block diagram of an exemplary actuation control system according to an embodiment of the present invention.

Turning now to the description and with reference first to FIG. 1, a functional block diagram of an exemplary actuator control system 100 is shown. The system 100, which may be used to control the movement of one or more flight control surfaces or one or more thrust vector control elements, includes an actuator assembly 102 and a controller 150. The actuator assembly 102 includes a plurality of motors 104 (104-1, 104-2), an actuation member 106, a translation member 108, and a plurality of position sensors 112, 114, 116. The motors 104 are each preferably enclosed within a motor housing 118, and are each coupled to an output shaft 122. The motors 104 are preferably implemented as electric motors, and may be any one of numerous types of AC or DC motors now known or developed in the future including, for example, an AC induction motor or a brushed DC motor. In a preferred embodiment, however, the motors 104 are each implemented as brushless DC motors. Although the motors 104 are preferably implemented as electric motors, it will nonetheless be appreciated that the motors 104 could be implemented, if so desired, as pneumatic or hydraulic motors. It will additionally be appreciated that the actuator assembly 102 could, if needed or desired, be implemented with more than two motors 104.

No matter the specific number of motors 104 or how the motors 104 are specifically implemented, each is configured, upon being properly energized and supplied with actuation position control signals, to rotate and thereby supply a rotational drive force to its associated motor output shaft 122. The motor output shafts 122 are each coupled to the actuation member 106 via a gear assembly 124, to thereby supply the rotational drive force thereto. In response to the rotational drive force supplied from the motor output shafts 122, the actuation member 106 rotates.

The translation member 108 is coupled to the actuation member 106 and is configured, upon rotation thereof, to translate to a position. As will be described in more detail further below, the actuation member 106 and the translation member 108 are preferably implemented as a ballscrew assembly, in which the ballscrew functions as the actuation member 106 and the ballnut functions as the translation member 108. It will be appreciated, however, that this is merely exemplary, and that the actuation member 106 and translation member 108 could be implemented as any one of numerous assemblies that convert rotational motion into translation motion including, for example, jackscrew assemblies and rollerscrew assemblies, just to name a few.

The position sensors include a first position sensor, a second position sensor, and a third position sensor 112, 114, 116, respectively. The first position sensor 112 is disposed within the actuation member 106 and is additionally coupled to the translation member 108. Thus, when the translation member 108 translates in response to actuation member 106 rotation, the portion of the first position sensor 112 that is coupled to the translation member 108 translates a commensurate distance. The first position sensor 112 is configured to supply a position signal representative of translation member position.

The second and third position sensors 114, 116 are each disposed in one of the motor housings 118, and are each coupled to receive the rotational drive force supplied from one of the motors 104. In response to the rotational drive force, the second and third position sensors 114, 116 rotate, and supply a position signal representative of the rotational position of its associated motor 104. The motor rotational signals are also representative of the position of the translational member 108. As FIG. 1 additionally depicts, the position signals from each of the position sensors 112, 114, 116 are preferably supplied to the controller 150.

The controller 150 supplies actuation position control signals to the motors 104 and, as was just mentioned, receives redundant, dissimilar position signals from each of the position sensors 112, 114, 116. The controller 150 is configured to receive external control signals from one or more external sources (not shown in FIG. 1). In response to these control signals, the controller 150 simultaneously supplies the actuation position control signals to both motors 104, which appropriately energizes the motors 104 to rotate in the direction that will cause the translation member 108 to move to a desired position. The controller 150, using the redundant, dissimilar position signals as feedback, implements a closed-loop control loop to move the translation member 108 to the desired position. It will be appreciated that the controller 150 may be configured to implement any one of numerous control schemes. For example, the controller 150 may be a flight surface controller that is configured to implement one or more aircraft flight surface control schemes, or a missile thrust vector controller that is configured to implement one or more thrust vector control schemes.

Figure 2:
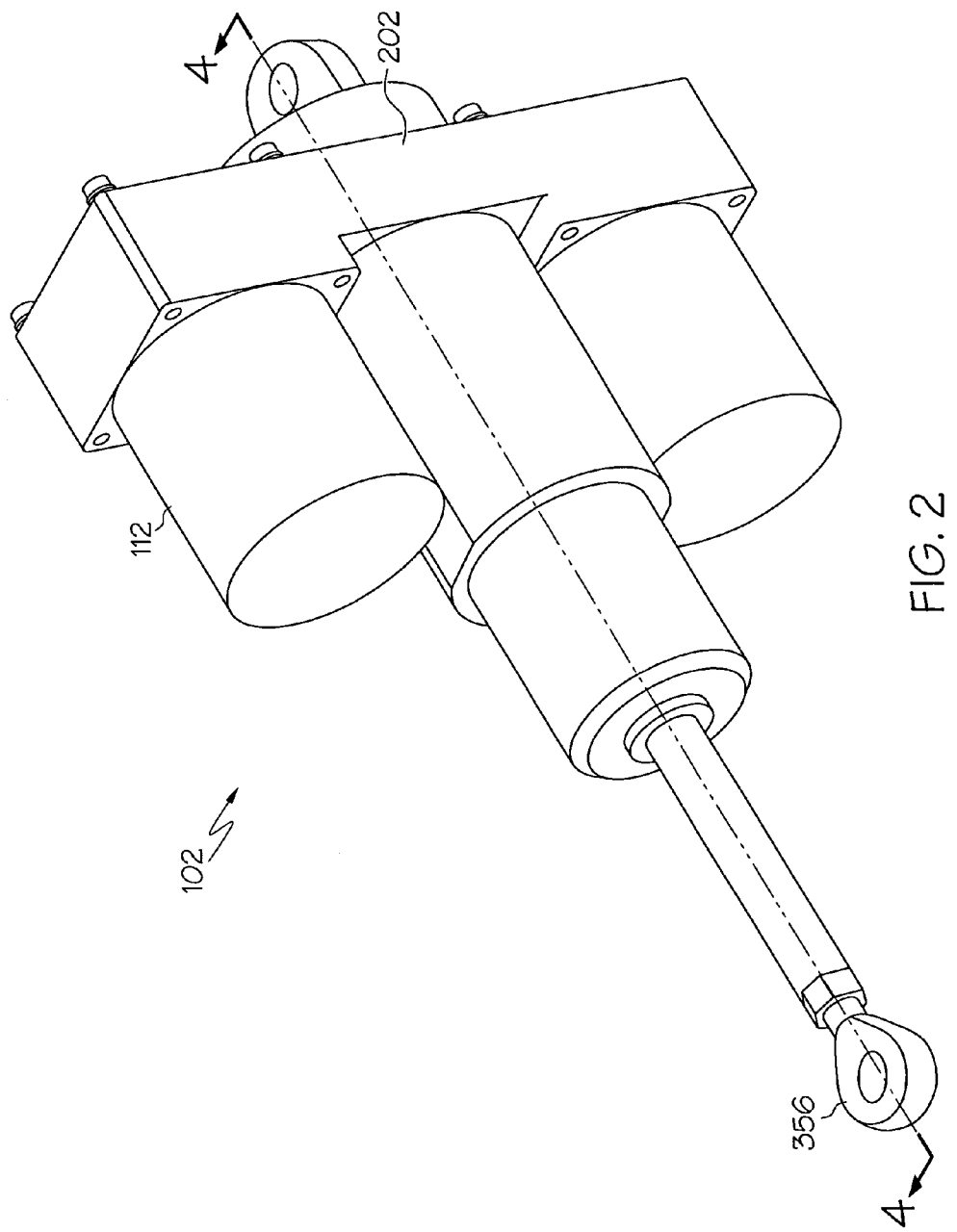
FIG. 2 is a perspective view of an exemplary physical implementation of an actuator assembly that may be used to implement the system of FIG. 1.
Figure 3:
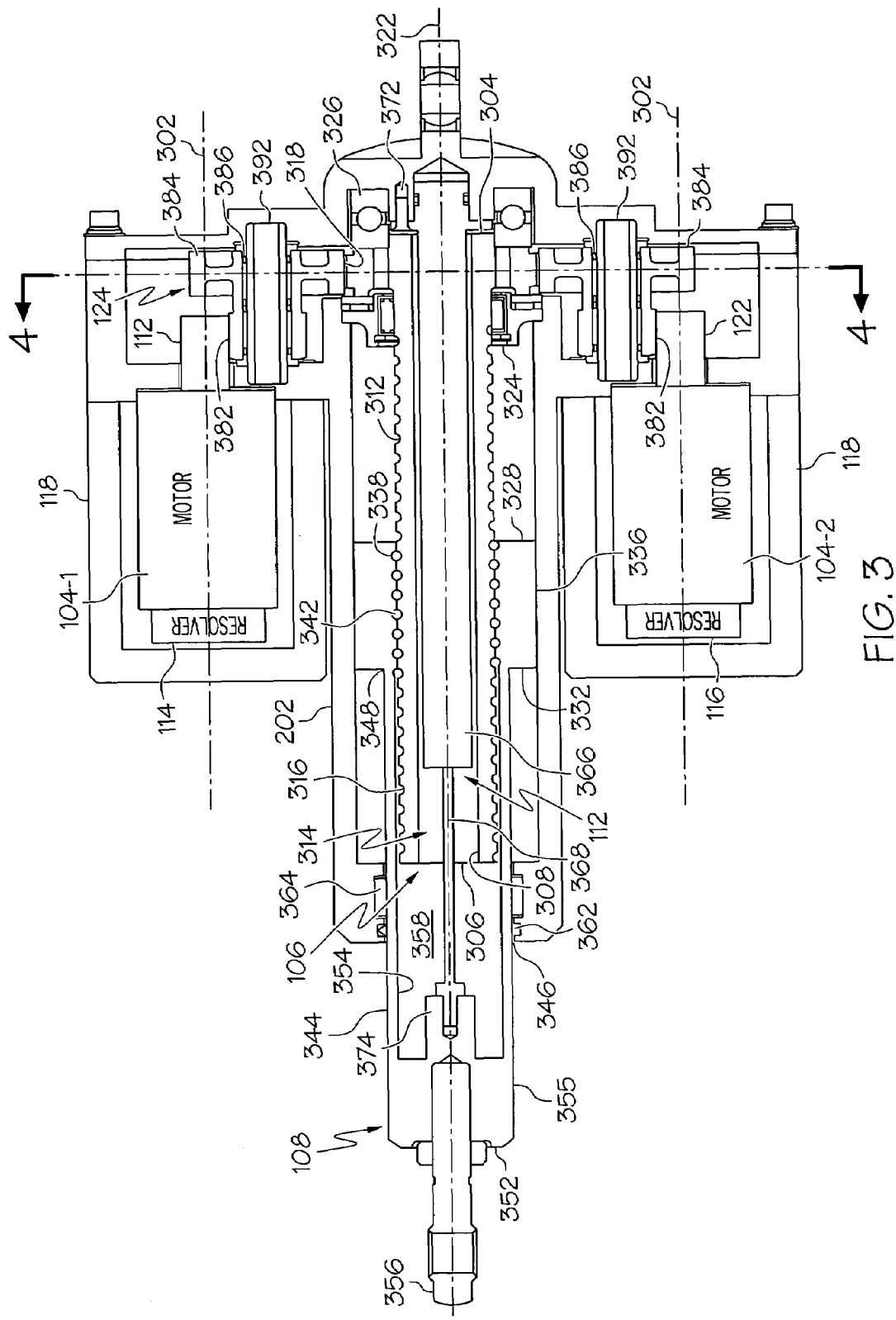
FIG. 3 is a cross section view of the actuator assembly shown in FIG. 2, taken along line 4-4 in FIG. 2.
Figure 4:
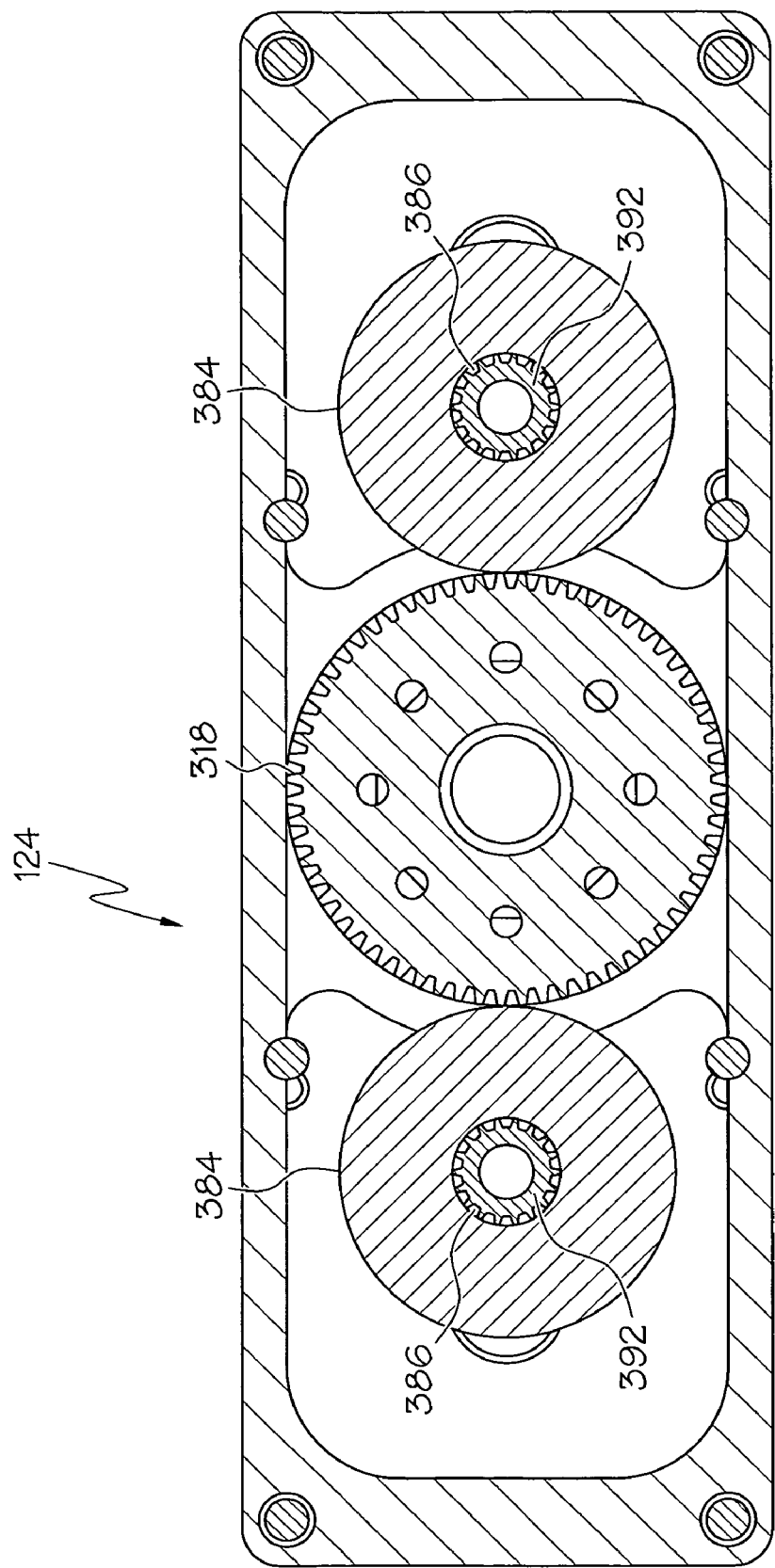
FIG. 4 is a cross section view of the actuator assembly shown in FIGS. 2 and 3, taken along line 4-4 in FIG. 3.

Turning now to FIGS. 2-4, an embodiment of a particular preferred physical implementation the actuator assembly 102 described above is shown, and will now be described in more detail. The actuator assembly 102 shown in FIGS. 2-4 includes physical implementations of the various actuator components described above, which for convenience are labeled using like reference numerals as in FIG. 1. As is shown most clearly in FIG. 3, which is a cross section view taken along line 3-3 in FIG. 2, the depicted actuator 102 is implemented with the motors 104, the actuation member 106, the translation member 108, the position sensors 112, 114, 116, and the gear assembly 124 all disposed at least partially within or on a single actuator housing assembly 202.

The actuator housing assembly 202 completely encloses each of the above-mentioned components, with the exception of the motors 104. The motors 104 are instead mounted within the respective motor housings 118, which are separately mounted to the actuator housing assembly 202. The actuator housing assembly 202 and motor housings 118 are configured such that, upon being coupled to one another, the motor output shafts 122 extend into the actuator housing assembly 202.

Turning now to a description of the components mounted within or on the actuator housing assembly 202, it will be appreciated that the motors 104 function, and are configured, as described above. Thus, each is preferably a brushless DC motor that is mounted within its associated motor housing 118. The motors 104 receive actuator position command signals from the controller 150, via non-illustrated motor connectors. In response to the actuator position command signals, the motors 104 each rotate in the commanded direction, along rotational axes 302, to supply a rotational drive force to the actuation member 106. As was noted above, in the depicted embodiment the rotational drive forces are supplied to the actuation member 106 via a gear assembly 124. A detailed description of an embodiment of the gear assembly 124 is provided further below. Initially, however, the remainder of the depicted actuator assembly 102 will be described.

The actuation member 106, which as noted above is preferably implemented as a ballscrew, is rotationally mounted within the actuator housing assembly 202, and includes a first end 304, a second end 306, an inner surface 308, and an outer surface 312. The ballscrew inner surface 308 defines a substantially cylindrical sensor passageway 314 that extends at least partially through the ballscrew 106. The ballscrew outer surface 312 has a plurality of ball grooves (or "threads") 316 formed thereon and has an input gear 318 coupled thereto proximate the ballscrew first end 304. The input gear 318 receives the rotational drive forces supplied from the motors 104, via the above-mentioned gear assembly 124, which in turn causes the ballscrew 106 to rotate about a rotational axis 322 that is parallel to, and displaced from, the motor rotational axes 302.

A plurality of bearing assemblies, which includes a ball bearing assembly 324 and a thrust bearing assembly 326, are mounted within the actuator housing assembly 202. The ball bearing assembly 324 is used to rotationally support the ballscrew 106 in the actuator housing assembly 202. The thrust bearing assembly 326, which is preferably disposed between the actuator housing assembly 202 and the ballscrew first end 304, transfers any axial force supplied to the ballscrew 106 to the actuator housing assembly 202.

The translation member 108 is preferably implemented as a ballnut, and is disposed at least partially around the ballscrew 106. The ballnut 108, similar to the ballscrew 106, includes a first end 328, a second end 332, an inner surface 334, and an outer surface 336. The ballnut 108 is mounted against rotation within the actuator housing assembly 202 and is configured, in response to rotation of the ballscrew 106, to translate axially within the actuator housing assembly 202. In the depicted embodiment, a portion of the ballnut outer surface 336, proximate the ballnut first end 328, is disposed at least partially within a groove or slot (not shown) formed in a section of the actuator housing assembly 202, to thereby prevent its rotation. Alternatively, the ballnut outer surface 336 could have a groove or slot formed therein in which a section of the actuator housing assembly 202 is inserted. Moreover, it will be appreciated that the ballnut 108 could be mounted against rotation in any one of numerous manners.

The ballnut 108, similar to the ballscrew 106, has a plurality of ball grooves (or "threads") 338 formed therein. However, unlike the ballscrew ball grooves 316, the ballnut ball grooves 338 are formed in a section of the ballnut inner surface 334, proximate the ballnut first end 328. A plurality of recirculating balls 342 are disposed within the ballnut ball grooves 338, and in selected ones of the ballscrew ball grooves 316. The balls 342, in combination with the ball grooves 316, 338, convert the rotational movement of the ballscrew 106 into the translational movement of the ballnut 108. It will be appreciated that the direction in which the ballnut 108 travels will depend on the direction in which the ballscrew 106 rotates.

The ballnut 108 additionally includes a shaft section 344 that extends through an opening 346 in the actuator housing assembly 202. The shaft section 344, as shown most clearly in FIG. 3, includes a first end 348, a second end 352, an inner surface 354, and an outer surface 355. The shaft first end 348 is disposed within the actuator housing assembly 202, whereas the shaft second end 352 is disposed external thereto and has a rod end assembly 356 coupled thereto. The rod end assembly 356 is configured to couple the ballnut 108 to a component (not shown), such as an aircraft or missile flight surface or a missile thrust vectoring nozzle, so that the actuator 102 can move the component to the position commanded by the controller 150.

The shaft section inner surface 354 forms a cavity 358 that has an open first end disposed in the shaft second end 352, and extends to a closed second end that is formed proximate the shaft first end 348. A seal 362 and a bushing 364 are disposed within the housing assembly opening 346 and surround that portion of the shaft outer surface 355 that is disposed within the opening 346. The seal 362 prevents dust, particulate, or other debris from ingress into the actuator housing assembly 202.

The first position sensor 112 is disposed at least partially within the ballscrew 106 and is additionally coupled to the ballnut 108. More specifically, in the depicted embodiment the first position sensor 112 is implemented as a linear variable differential transformer (LVDT) that includes a differential transformer (not shown) disposed within a sensor housing 366, and a movable slug 368. The sensor housing 366 is coupled to the actuator housing assembly 202 via one or more fasteners 372, and extends into the sensor passageway 314 formed in the ballscrew 106. The movable slug 368 is coupled to the ballnut 108, via a slug mount 374 that is formed on the shaft section inner surface 354, and is movably disposed within, and extends from, the sensor housing 366.

The differential transformer, as is generally known, includes at least a non-illustrated primary winding, and a non-illustrated differentially wound secondary winding. The transformer primary winding is energized with an AC signal supplied from, for example, the controller 150 via a non-illustrated sensor connector, and the secondary winding supplies a position signal representative of the position of the movable slug 368 to, for example, the controller 150 via the non-illustrated connector. Because the movable slug 368 is coupled to the ballnut 108, the movable slug 368 translates whenever the ballnut 108 translates. Thus, the position signal supplied from the secondary winding is representative of the position of the ballnut 108, which may in turn be correlated to the position of the element to which the actuator assembly 102 is coupled.

It will be appreciated that an LVDT is merely exemplary of a particular preferred embodiment of the first position sensor 112, and that the first position sensor 112 may be implemented using any one of numerous other sensing devices now known, or developed in the future. Examples of alternative position sensors include, but are not limited to, a rotary variable differential transformer (RVDT), a potentiometer, one or more Hall sensors, and one or more optic sensors.

The second and third position sensors 114,116 are each disposed within one of the motor housings 118 and are each mounted on one of the motors 104. The second and third position sensors 114, 116 are each preferably implemented as resolvers and thus supply position signals, as previously mentioned, that are representative of the rotational position of its associated motor 104. As was also previously mentioned, the rotational position signals are representative of the translational position of the ballnut 108. Thus, as with the position signal from the first position sensor 112, the position signals from the second and third position sensors 114, 116 may be correlated to the position of the element to which the actuator assembly 102 is coupled.

With reference now to FIGS. 3 and 4, an exemplary embodiment of the gear assembly 124 will now be provided. Before doing so, it is noted that the gear assembly 124 may be implemented using any one of numerous gear arrangements, now known or developed in the future, that may be configured as a step-down torque summed gear train to provide a desired rotational speed reduction of the motor output shafts 122. It will additionally be appreciated that the rotational speed reduction provided by the gear assembly 124 may vary to achieve a desired torque-speed characteristic for the actuator 102.

In the depicted embodiment, the gear assembly 124 includes a plurality of motor output gears 382, a plurality of idler gears 384, and the previously mentioned ballscrew input gear 318. More specifically, it is seen that the motor output gears 382 are each coupled to, or are each integrally formed on, one of the motor output shafts 114, and each engages one of the idler gears 384. Each idler gear 384 is rotationally mounted within the actuator housing assembly 202 via a roller bearing assembly 386. The roller bearing assemblies 386 are in turn mounted on bearing shafts 392, which are mounted against rotation. Each idler gear 384, in addition to engaging a motor output gear 382, engages the ballscrew input gear 318.

With the above described gear assembly 124 configuration, each idler gear 384 receives, via its associated motor output gear 382, the rotational drive force supplied by its associated motor 104. The idler gears 384, in response to the received rotational drive force, rotate and supply the rotational drive force to the ballscrew input gear 318. In response, the ballscrew 106 rotates, which in turn causes the ballnut 108 to translate.

The above-described actuator assembly is compact and lightweight, and can withstand the relatively severe environmental conditions and/or relatively high shock and vibration demands associated with various aerospace applications. Moreover, the use of two motors operating simultaneously to move the actuator provides minimum inertia for quick response. The use of redundant, dissimilar position feedback sensors provides for the accurate positioning of the component being moved by the actuator assembly.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An actuator assembly, comprising:
   a plurality of motors, each motor adapted to receive electrical drive power and configured, upon receipt thereof, to supply a drive force;
   an actuation member coupled to receive the drive force from each of the motors and configured, upon receipt thereof, to rotate;
   a translation member disposed adjacent the actuation member and configured, upon rotation of the actuation member, to translate to a position;
   a first position sensor mounted within the actuation member and configured to sense the position of the translation member and supply a first position signal representative thereof;
   a second position sensor, dissimilar from the first position sensor, coupled to receive the drive force from a first one of the plurality of motors and operable, upon receipt thereof, to supply a second position signal, dissimilar from the first position signal, that is representative of the position of the translation member; and
   a third position sensor, dissimilar from the first position sensor, coupled to receive the drive force from a second one of the plurality of motors and operable, upon receipt thereof, to supply a third position signal, dissimilar from the first position signal, that is representative of the position of the translation member.

2. The actuator assembly of claim 1, wherein:
   the first position sensor comprises a linear variable differential transformer (LVDT); and
   the second and third position sensors each comprise a resolver.

3. The actuator assembly of claim 2, wherein:
   the LVDT includes a differential transformer having primary windings and secondary windings, and a movable slug disposed between the primary and secondary windings;
   the differential transformer is disposed within the actuation member; and
   the movable slug is coupled to, and movable with, the translation member.

4. The actuator assembly of claim 1, wherein the translation member further includes a first end and a second end, and wherein the actuator assembly further comprises:
   a rod end assembly coupled to the translation member second end, the rod end assembly configured to couple the translation member to an aerospace component.

5. The actuator assembly of claim 1, wherein each of the motors is a brushless DC motor.

6. The actuator assembly of claim 1, further comprising:
   an actuator housing assembly,
   wherein each of the motors is mounted on the actuator assembly housing.

7. The actuator assembly of claim 1, further comprising:
   a gear assembly coupled between each of the motors and the actuation member, the gear assembly configured to receive the rotational drive force supplied by each of the motors and transfer the rotational drive force to the actuation member.

8. The actuator assembly of claim 7, wherein the gear assembly is configured as a torque summed gear train.

9. An actuator assembly, comprising:
   a housing;
   a plurality of motors mounted on the housing, each motor configured to supply a rotational drive force;
   a ballscrew rotationally mounted within the housing and including at least an inner surface and an outer surface, the ballscrew inner surface defining a sensor cavity, the ballscrew outer surface having one or more ball grooves formed thereon, the ballscrew adapted to receive the rotational drive force from each of the motors and configured, in response thereto, to rotate;

a ballnut disposed at least partially within housing and mounted against rotation, the ballnut disposed at least partially around the ballscrew and including at least an inner surface and an outer surface, the ballnut inner surface having one or more ball grooves formed thereon;

a plurality of balls disposed within the one or more ballnut ball grooves and at least selected ones of the one or more ballscrew ball grooves, whereby rotation of the ballscrew causes translation of the ballnut to a position;

a first position sensor disposed at least partially within the ballscrew cavity, the first position sensor configured to sense the position of the ballnut and supply a position signal representative thereof;

a second position sensor, dissimilar from the first position sensor, coupled to receive the drive force from a first one of the plurality of motors and operable, upon receipt thereof, to supply a second position signal, dissimilar from the first position signal, that is representative of the position of the ballnut; and a third position sensor, dissimilar from the first position sensor, coupled to receive the drive force from a second one of the plurality of motors and operable, upon receipt thereof, to supply a third position signal, dissimilar from the first position signal, that is representative of the position of the ballnut.

10. The actuator assembly of claim 9, wherein:

the first position sensor comprises a linear variable differential transformer (LVDT); and the second and third position sensors each comprise a resolver.

11. The actuator assembly of claim 10, wherein:

the LVDT includes a differential transformer having primary windings and secondary windings, and a movable slug disposed between the primary and secondary windings;

the differential transformer is disposed within the ballscrew; and the movable slug is coupled to, and movable with, the ballnut.

12. The actuator assembly of claim 9, further comprising:

a torque summed gear train coupled between each of the motors and the ballscrew, the torque summed gear train configured to receive the rotational drive force supplied by each of the motors and transfer the rotational drive force to the ballscrew.

13. The actuator assembly of claim 9, wherein:

the ballscrew rotates about an actuator axis;

the ballnut translates along the actuator axis; and each motor rotates about a motor axis that is parallel to, and displaced from, the actuator axis.

14. An actuation control system, comprising:

a plurality of motors, each motor coupled to receive actuator position control signals and operable, in response thereto, to supply a drive force;

an actuation member coupled to receive the drive force from the motors and configured, upon receipt thereof, to rotate;

a translation member disposed adjacent the actuation member and adapted to couple to an aerospace flight control component, the translation member configured, upon rotation of the actuation member, to translate to a position;

a first position sensor mounted within the actuation member and configured to sense the position of the translation member and supply a first position feedback signal representative of the position thereof;

a second position sensor, dissimilar from the first position sensor, coupled to receive the drive force from a first one of the plurality of motors and operable, upon receipt thereof, to supply a second position feedback signal, dissimilar from the first position signal, that is representative of the position of the translation member;

a third position sensor, dissimilar from the first position sensor, coupled to receive the drive force from a second one of the plurality of motors and operable, upon receipt thereof, to supply a third position signal, dissimilar from the first position signal, that is representative of the position of the translation member; and a controller adapted to receive control signals and coupled to receive the first position feedback signal, the second position feedback signal, and the third position feedback signal and configured, in response to the received signals, to supply the actuator position control signals to the plurality of motors.

15. The system of claim 14, wherein the controller is an aircraft flight surface controller.

16. The system of claim 14, wherein the controller is a thrust vector controller.

* * * * *